Jan. 12, 1932.   C. C. PECK   1,840,601
ARC WELDING MECHANISM
Filed July 21, 1928   4 Sheets-Sheet 1

Fig. 1
Fig. 6

INVENTOR.
Cecil C. Peck.
BY
Fay, Oberlin & Fay
ATTORNEYS

Jan. 12, 1932.       C. C. PECK       1,840,601
ARC WELDING MECHANISM
Filed July 21, 1928     4 Sheets-Sheet 3

Patented Jan. 12, 1932

1,840,601

UNITED STATES PATENT OFFICE

CECIL C. PECK, OF CLEVELAND, OHIO, ASSIGNOR TO THE LINCOLN ELECTRIC COMPANY, OF CLEVELAND, OHIO, A CORPORATION OF OHIO

ARC WELDING MECHANISM

Application filed July 21, 1928. Serial No. 294,438.

The present invention, relating as indicated, to arc welding mechanism, has more particular reference to welding processes wherein an electric arc is generated between one or more of the parts to be welded and a carbon rod or electrode which is moved along a line or over a surface as necessary to progress the arc in the operations of fusing, depositioning, or welding.

In its rudimentary form, the above mentioned process is objectionable in several respects; firstly, the arc has a decided tendency to lag and shift irregularly; secondly, the carbon electrode is gradually consumed and recedes from the work; and thirdly, the resulting welds are sometimes not only mechanically weak but also polluted with detrimental inclusions such as oxides and occluded or combined nitrogen. Arc movements are produced by a number of variable factors which are extremely difficult to control; the carbon electrode becomes gradually shorter because of oxidation and crumbling; and the welds are not satisfactory primarily because of the atmosphere in which the welding operation is conducted.

This invention, with the general object of improving the welds produced by the carbon arc process, contemplates the provision of an improved welding apparatus which among others has the following features: a continuously rotating electrode which neutralizes or reduces arc shifting; an electrically controlled means for projecting or retracting the electrode in order to maintain a predetermined spacing between such electrode and the work; means for varying the speed of electrode rotation; means for fixing the electrode-work spacing; means for electromagnetically stabilizing the arc; means for ejecting shortened electrodes; means for facilitating manual manipulation of the electrode; means for facilitating electrode replacements; means for creating and maintaining a reducing or neutral atmosphere in the vicinity of the arc; synchronously operated means for feeding the combustible material which forms a neutral or reducing atmosphere in blanketing relation to the weld being produced; manually operated means for permitting independent manipulation of the blanket forming material; and an assembly or design which is both compact and convenient to use and service. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In the drawings, and with particular reference to Figs. 1 to 9 inclusive, the improved welding mechanism provided by this invention is shown as comprising a housing 1 which is provided with a laterally extending shelf 2 and a downwardly projecting boss 3. Mounted upon the shelf 2 is an electric motor 4 which has a depending shaft 5 provided with a worm 6. The shaft 5 is preferably operated indirectly through a suitable reduction gearing consisting of a pinion 7 mounted upon the motor shaft 8 and a gear 9 secured to the shaft 5. The worm 6 operates an intermeshed worm wheel 10 and both are encased by an enlargement 11 of the housing 1 which is closed by a removable cap 12. The worm wheel 10 is mounted upon a shaft 13 which carries a worm 14 and a worm 15, the former meshing with a worm wheel 16 and the latter with another worm wheel 17. The worm wheel 17 is mounted upon a suitably journalled shaft 18 that carries a friction wheel 19 provided with teeth 20 which engage with similar teeth on a second friction wheel 21 mounted upon a shaft 22 revolubly journalled in bearings formed in a member 23 which is pivoted to a frame 24 by a rod 25 and drawn towards said frame by a spring 26 connected between brackets 27. The frame 24 has a lug 28 for attachment to the housing 1 and the member 23 has a handle 29. A casing 30 encloses the assembly and is provided with a boss 31 for receiving the tube 32, a boss 33 for receiving the bushing 34, and an opening through which projects the handle 29.

The worm wheel 16 is mounted upon a hub 35 which is journalled in bearings in the housing 1 and its cap plate 36. This hub has a longitudinally extending inside bore 37 and a contiguous groove 38. On an enlargement just above the worm wheel 16 it carries brackets 39 and 40, the former revolubly supporting a shaft 41 provided with a disc 42 having radially extending teeth 43 and a gear 44, and the latter revolubly supporting a shaft 45 provided with a gear 46 which meshes with the gear 44, and a gear 47 which extends through an opening into the groove 38. Within an enlargement of the chamber containing the instrumentalities just described are two solenoids 48, one having an armature 49 held in an elevated position by a spring 50, and the other having an armature 51 held in a depressed position by a spring 52. The armatures 49 and 51, when attracted by the solenoids 48, adjustably come into the path of the teeth 43, one of such armatures being below and the other above the center of the disc 42, whereby, as said disc revolves bodily around with the hub 35 such armatures, under conditions hereafter explained, will rotate the gear 47 in one or the other of two opposite directions.

Positioned within the bore 37 of the hub 35 is a carbon holder 53 which has a side rack 54 and a bore 55. In placing the carbon holder within the bore of the hub 35, the rack 54 is slid within the unobstructed part of the groove 38 until such holder has reached the desired level; then it can be revolved to bring the teeth of the rack 54 into mesh with the teeth of the gear 47, a spring pressed plunger 56 engaging in the longitudinal groove 57 to hold the rack and gear in engagement. Similarly when removing the carbon holder, it is necessary to revolve it until the rack 54 disengages from the gear 47 and enters the unobstructed part of the relatively wider hub groove 38. Near its bottom, the bore 55 is provided with an insert 58 which extends into such bore and coacts with a flat on the carbon electrode 59 to positively hold such electrode against relative rotation and frictionally against longitudinal movement. The bore 55, near its top, is enlarged as at 60 to receive a spring 61 which presses against a collar 62 on the ejecting rod 63. Just above the collar 62 the rod 63 is encircled by an annulus 64 which is secured to the top of the carbon holder 53, and above this carries a knob 65 and a stop collar or flange 66. From an inspection of Fig. 7 it will be apparent that the electrode 59 while securely held against movement by the insert 58 can be easily disengaged or removed simply by pressing the knob 65, the rod 63 being returned to its upper position by the spring 61.

Figures 1, 6:
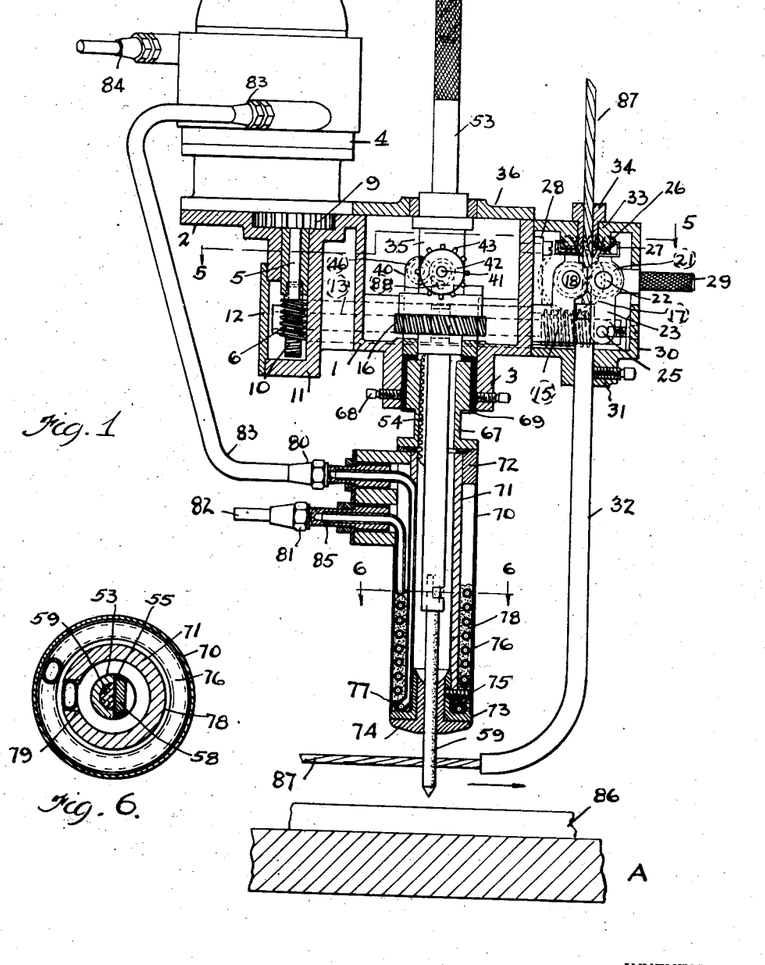
Fig. 1 is a partly sectional elevational view of a welding mechanism embodying the present improvements.
Fig. 6 is a transverse horizontal section taken on a plane indicated by the line 6—6 of Fig. 1.
Figures 2, 3, 7:
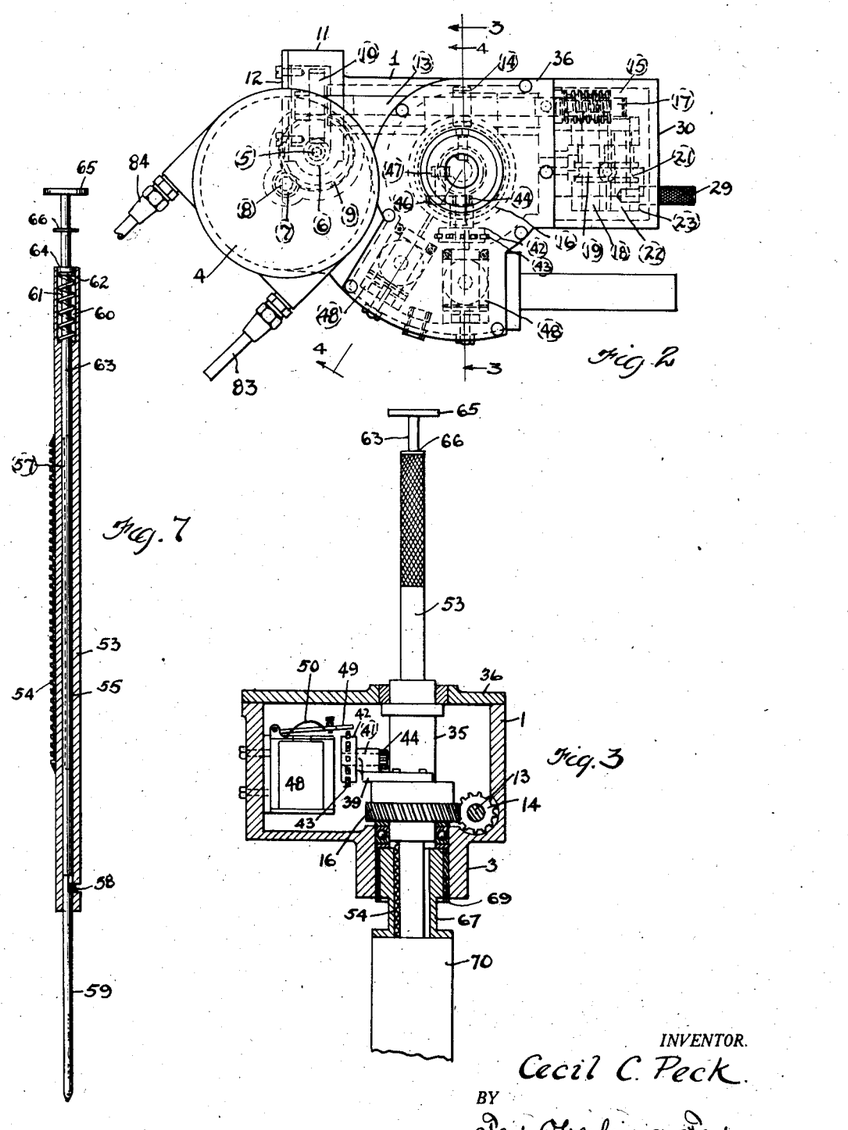
Fig. 2 is a plan view of the apparatus shown in Fig. 1.
Fig. 3 is a partly sectional and partly elevational view taken substantially on the line 3—3 of Fig. 2.
Fig. 7 is a partly elevational sectional view of the carbon electrode holder, and shows the means provided for ejecting shortened electrodes.
Figures 4, 5, 8, 9:
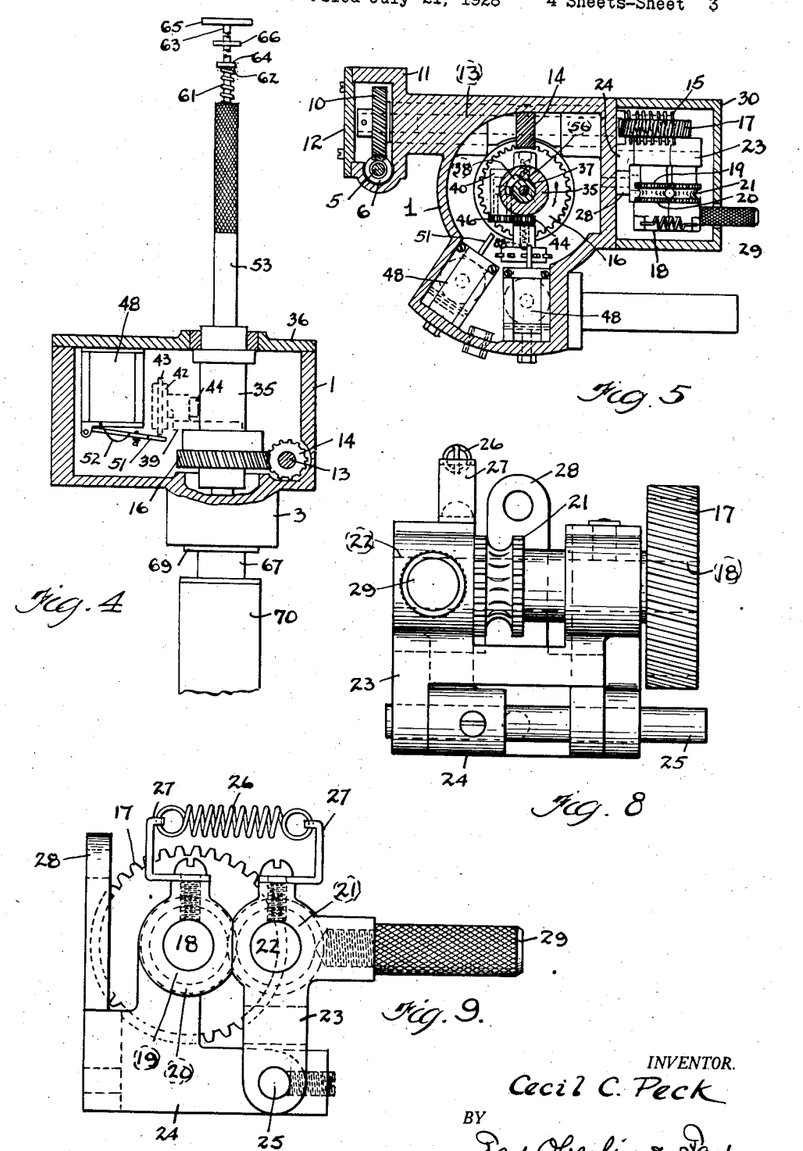
Fig. 4 is a partly sectional and partly elevational view taken susbtantially on the line 4—4 of Fig. 2.
Fig. 5 is a horizontal section taken substantially on the line 5—5 of Fig. 1.
Fig. 8 is an end elevation of the means employed for feeding a material for forming a neutral or reducing atmosphere around the arc and weld being produced.
Fig. 9 is a side elevation of the apparatus shown in Fig. 8.

Depending from the boss 3 is a part 67 which, as best shown in Fig. 1, is held in place by set screws 68 acting against the interposed insulation 69. To the part 67 is secured a tube 70, and between this tube and another tube 71 is a spacing piece 72. The tube 71 threadably engages with an outwardly flanged end piece 73 adapted for receiving an electrode contact 74 which may be either soldered in place or removably held by a set screw 75. In the annular space between the tubes 70 and 71 is a helically coiled pipe 76 which carries a preferably brazed bottom part 77 and has its upper turns packed in insulating material 78. One end of the pipe 76 passes upwardly from the bottom part 77 in a slot 79 formed in the tube 71 and terminates in an insulated connection 80; while the other end, from the upper coil, terminates in an insulated connection 81 and forms a water inlet 82, the connection 80 having a water outlet tube 83 which leads to the motor 4, is coiled around its stator, and then terminates in a connection 84. As intimated, water may be circulated through the continuous duct so formed, and the connection 81 has a part 85 to which the negative side of the arc circuit is connected, the current passing from the electrode 59, through the contact 74, the piece 73, part 77, the helical pipe 76 and the connection 81.

The welding arc is generated or struck between the work 86, which may be supported upon a table A, and the carbon cathode 59. It will be understood that the entire apparatus illustrated in Fig. 1 may be suitably supported, and either it or the work moved in order to progress the arc. When operating, ordinarily the work 86 forms the anode and the carbon 59 the cathode. The negative side of the welding circuit, as above stated, connects at 85, and the current is therefore compelled to move through the helical tube 76. This creates a magnetic field adjacent the arc and has a pronounced stabilizing effect. The continuously rotating motor 4, through the gearing arrangement hereinbefore described, revolves the cathode 59, and also the feed wheels 19 and 21, such wheels operating to feed the material 87 from a reel (not shown) through the tube 32 which terminates in the vicinity of the arc. This material may be paper or other fibrous or carbonaceous substance that will burn and produce a neutral or reducing atmosphere in blanketing relation to the weld. It may be impregnated with a chemical such as a salt of an alkali metal, and its function, broadly speaking, is to improve the weld produced by minimizing arc fluctuations and obviating detrimental gaseous conditions in the vicinity of the heated or molten metal. By forcing the handle 29 down, the wheel 21 may be moved out of engagement and the material 87 then inserted, removed or otherwise manipulated as desired, it being apparent that such material is normally fed through an opening in the bushing 34 and through the space between the concave and desirably roughened peripheries of the friction wheels 19 and 21 by the gearing provided for the purpose. The carbon holder 53 may be manually adjusted or manipulated in the manner previously described, and the electrode 59 is automatically maintained in a predetermined spaced relation to the work, being elevated or depressed according as the arc is too short or too long. If the arc length varies from a selected standard or norm, one or the other of the armatures 49 and 51 is attracted, thereby turning the passing disc 42 in one or the other of two opposite directions, and through the gear 47 and the rack 54 suitably elevating or depressing the electrode 59. A spring pressed ball 88 frictionally engages the roughened inner face of the disc 42 and yieldably resists turning thereof by the armatures 49 and 51, such ball also preventing unintended movement of the rack 54 while the disc 42 revolves bodily with the hub 35. During operation and for cooling purposes, water may be circulated through the continuous duct made up of the coil 76, the tube 83 and the motor coil (not shown), such water being preferably admitted at 82 and withdrawn through the connection 84.

Figure 10:
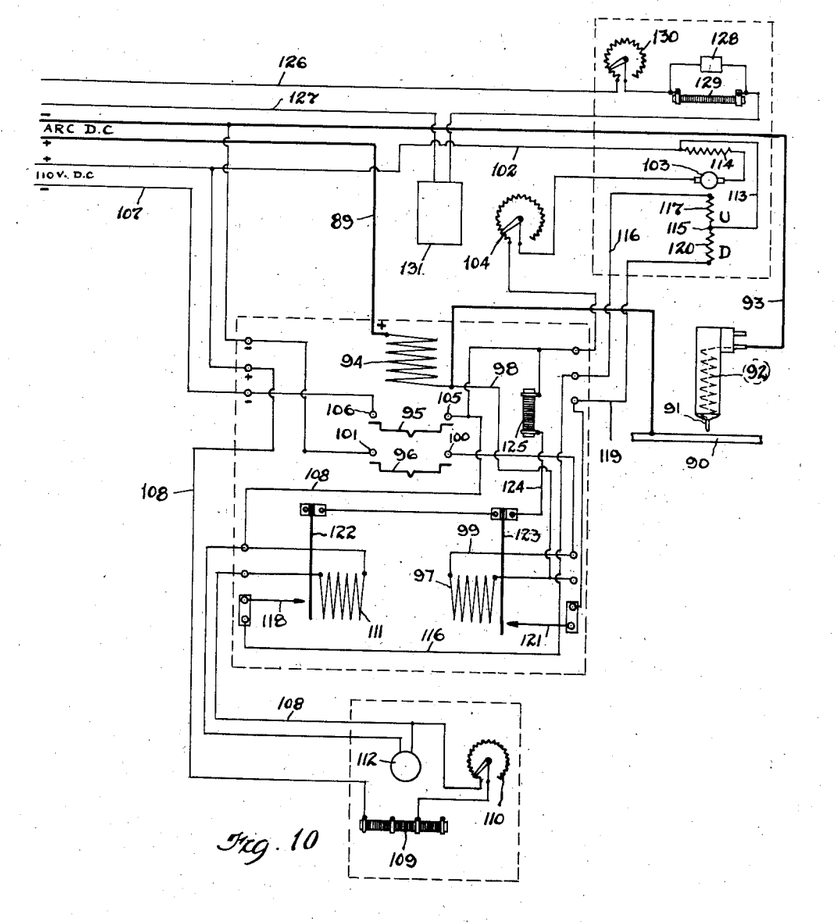
Fig. 10 is a diagram illustrating electrical circuits and apparatus suitable for accomplishing the various functions to which the mechanism shown in preceding views is adapted.

For effecting the different functions hereinbefore enumerated and explained, the electrical circuits and apparatus illustrated in Fig. 10 may be employed. The arc or welding current from a preferably separately excited generator is conducted through a cable 89 to the anode 90, and returns through the cathode 91, the helix 92, and the cable 93. Serially connected in the cable 89 is a solenoid 94 which, when the welding circuit is energized, elevates the contacts 95 and 96. A solenoid 97 has one of its leads 98 connected to the positive cable 89, and the other of its leads 99 connected through the contacts 100, 96 and 101 to the negative cable 93. A separate circuit comprises a positive lead 102 which conducts current through a series wound motor 103 (the motor 4 in preceding figures), the rheostat 104, contacts 105, 95 and 106 to the negative lead 107. A conductor 108 connects with the positive lead 102 and carries current through a resistor 109, a variable rheostat 110 and a solenoid 111, and connects through the contacts 105, 95 and 106 with the negative lead 107. A suitable meter 112 may be shunted around the solenoid 111 and facilitates making any desired change in the strength of the magnetic field created by such solenoid. A conductor 113 connects with the lead 102 at a point in advance of the motor field 114, divides at 115, and then continues as two separate conductors, the one 116 leading through a solenoid 117 and terminating in a contact 118, and the other 119 leading through a solenoid 120 and terminating in a contact 121. Arranged for coaction with the contacts 118 and 121 are two contacts 122 and 123, these contacts being both connected to a conductor 124 which leads through a resistor 125 and connects with the lead 102 at a point between the variable rheostat 104 and the contact 105. The solenoid 117 corresponds to the solenoid 48 shown to the right in Fig. 5 and the solenoid 120 corresponds to the solenoid 48 shown to the left in the same figure. In other words, when the disc 42 is revolving bodily in the direction indicated by the arrow in Fig. 5, the solenoid on the left (120), when energized will move the electrode 59 (91) down; similarly the solenoid on the right (117), when energized will move the electrode 59 (91) up. The conductors 126 and 127 are part of the circuit between the exciter and the welding generator. These conductors can be connected or disconnected by a suitable switch 128 which may be shunted around a resistor 129, and the exciter current can be regulated by a variable rheostat 130. A switch 131, suitably arranged in the conductor 127 may be employed for breaking the circuit in case the supply of cooling water to the conduits surrounding the depending part of the welder head and the stator of its motor is discontinued or its pressure reduced below a predetermined limit.

In operation, the switch 128 is actuated to connect the exciter with the windings of the welding generator, and initiate a flow of cooling water through the conduits hereinbefore described. The electrode 59 (91), by suitably manipulating the carbon holder 53, may be brought into contact with the work and then removed to initiate an arc. When the arc is struck, the solenoid 94 moves the contact 95 into operative relation to the contacts 105 and 106, and the contact 96 into operative relation to the contacts 100 and 101. The contact 95 thus places the motor 103 (4) in circuit, and energizes the solenoid 111; while the contact 96 energizes the solenoid 97. The solenoids 97 and 111 are arranged to pull on the opposite ends of a common armature or core. The rheostat 110, and if necessary the resistor 109, can be adjusted to select the arc length desired. When the electrode 91 (59) assumes a position which produces the arc length selected, the solenoids 97 and 111 balance each other and the contacts 122 and 123 take the positions shown in Fig. 10. If now, for any reason, the electrode 91 (59) approaches too closely to the work, the resistance of the welding circuit will decrease, its current will increase and its voltage will decrease; consequently the solenoid 111 will become more strongly energized than the solenoid 97. Under these conditions, the core between the solenoids 97 and 111 will be pulled to the left (Fig. 10), and the contact 122 moved into engagement with the contact 118, thereby energizing the solenoid 117 (48) and pulling its armature 49 into the path of the teeth 43. This, through the mechanism hereinbefore explained, operates to move the electrode 91 (59) upwardly, such movement continuing until the arc has been lengthened sufficiently to restore conditions of equilibrium in the solenoids 97 and 111. The solenoid 97, together with the elasticity of the contact 122, will then move the armature back to its normal position and, of course, the circuit through the solenoid 117 will be broken.

If, for any reason, the arc becomes too long, the resistance through the welding circuit will increase, its current will decrease and its voltage will increase; therefore the solenoid 97, relatively speaking, will become stronger than the solenoid 111. The solenoid 97 will accordingly move the armature or core to the right (Fig. 10), and push the contact 123 against the contact 121, thereby energizing the solenoid 120 (48) and bringing its armature 51 into the path of the teeth 43. This will result in lowering the electrode 91 (59) until the strength of the solenoid 111 again equals the strength of the solenoid 97; whereupon the armature, assisted by the resiliency of the contact 123, will move back to its normal position and break the circuit through the solenoid 120. These two circuits are completed and the electrode 91 (59) automatically moved to compensate for all changes in arc length, the appropriate up or down motion being effected in the manner just explained. As before stated, the rheostat 110 can be adjusted to select the normal arc length desired, and the rheostat 104 can be adjusted to regulate the speed of the motor 103 (4). If such motor revolves very rapidly, the electrode adjustments will be effected rapidly, while slower motor speeds will produce correspondingly slower electrode adjustments. The rheostat 104 can therefore be employed to determine the sensitiveness, or more exactly speaking, the rapidity with which electrode adjustments are effected. Variations in the speed of the motor 103 (4) also correspondingly affect the feed of the material 87, such material having the effects heretofore described when burned in the vicinity of the arc, and being more or less effective according to the amount burned.

From the foregoing description, it will be apparent that this invention provides a welding mechanism which, in one compact and easily manipulatable unit, embodies for facilitating the making of all necessary or desirable adjustments and replacements. It will also be apparent that the combined effect of the arc-length maintaining means, the electromagnetic stabilizing coil, and the burning of a carbonaceous and desirably impregnated material in the zone of the arc is to not only minimize or eliminate arc fluctuations but to greatly improve the physical characteristics of the resulting weld. The control means provided make it possible to regulate the rate of feed of the material being burned adjacent the arc, to select any normal arc length, to regulate the flow of cooling fluid, and to vary the rate at which the arc length is corrected and the electrode revolved; while, by the provision of suitable means heretofore described, manual manipulation of the burning material and the carbon holder is made easier and more convenient to effect.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In carbon arc welding mechanism, the combination of an electrode, means for continuously rotating said electrode about an axis intersecting the work, and means for operably adjusting said electrode axially in either direction toward and away from the work, said means being responsive to the voltage of the welding circuit and operable while said electrode revolves continuously in a single direction.

2. In carbon arc welding mechanism, the combination of an electrode; means for revolving said electrode; means for moving said electrode axially in either direction; and means operable while said electrode revolves continuously in a single direction and functioning responsively to the voltage across said arc, for actuating said moving means.

3. In carbon arc welding mechanism, the combination of an electrode, means for revolving said electrode, and means for moving said electrode axially in either direction, said means embodying magnets operating responsively to the electrical voltage across said arc.

4. In carbon arc welding mechanism, the combination of an electrode, means for moving said electrode axially in either direction, and means for controlling said moving means, said controlling means embodying a relay having an armature and bucking magnetic fields acting on said armature respectively generated by the welding circuit and an independent circuit.

5. In carbon arc welding mechanism, the combination of an electrode, means for moving said electrode axially in either direction, and means for controlling the operation of said moving means, said controlling means embodying a relay having normally balanced magnetic fields and circuits for unbalancing said fields responsive to variations in the voltage across said arc.

6. In carbon arc welding mechanism, the combination of an electrode, means for revolving said electrode, means for moving said electrode axially in either direction responsively to the voltage across said arc, and means for determining the rapidity of such movement.

7. In arc welding mechanism, a movable armature, a welding circuit having a solenoid coil adjacent said armature, an independent circuit having a solenoid coil adjacent said armature said arc circuit coil normally generating a magnetic force operably equal to the similar force being generated by said independent circuit coil, and an electric switch connected with said armature for closing any one of a plurality of electrical circuits as the magnetic force of said arc circuit coil varies.

8. In arc welding mechanism, an electrode, a welding circuit having a coil, a second circuit having a coil, a movable armature, said coils normally holding said armature in stationary position and being adapted to respectively move said armature in one or another direction according as the resistance of said arc fluctauates positively or negatively with reference to a pre-selected normal value, and means for moving said electrode axially in either direction, said means electrically actuated by a circuit controlled by said movable armature.

9. In arc welding mechanism, the combination of an electrode, a holder for said electrode, and electrically actuated means functionally responsive to the voltage across the arc for reciprocating said holder, said means embodying a gear meshed with a rack effective to move said electrode in the indicated manner.

10. In arc welding mechanism, an electrode, and power operated means for moving said electrode, means responsive to the movement of said electrode for feeding material adjacent to said electrode and means for manual feeding of such material.

11. In carbon arc welding mechanism, an electrode between which and the work an arc is generated, means for revolving said electrode means for moving said electrode towards and from the work, and means for controlling said moving means, said last named means operating responsively to voltage characteristics of said arc and being adjustable to select the values of said characteristics which determine the direction and extent of electrode movement.

12. In carbon arc welding mechanism, the combination of an electrode, a motor for revolving said electrode, means functionally responsive to the valtage across the arc for moving said electrode lengthwise in either direction, and means controlling said moving means; said motor, electrode, lengthwise mover and controller being embodied in a unit.

13. In carbon arc welding mechanism, the combination of an electrode, an electrode holder, means for revolving said electrode holder, and means for revolubly carrying said holder, said holder having a rack, and said carrying means having a gear adapted to mesh with said rack, said rack and gear being operable to control the lengthwise position of said electrode.

14. In carbon arc welding mechanism, the combination of an electrode, means for revolving said electrode continuously in the same direction, means functionally responsive to the voltage of the welding circuit for controlling the length of the arc generated between said electrode and the work, and a solenoid surrounding said electrode near said arc, the combined effect of said means and said solenoid being to stabilize said arc.

15. In carbon arc welding mechanism, the combination of an electrode between which and the work an arc is generated, means for feeding a combustible material adjacent to said arc, means functionally responsive to the voltage of the welding circuit for controlling the length of said arc, and magnetic means for exerting an influence on said arc, the combined effect of said means being to stabilize said arc.

16. In electric arc welding apparatus, a welding circuit including work material and a welding electrode, means for effecting relative movement between said work and electrode, an independent circuit, a relay having opposed magnetic fields respectively responsive to characteristics of said welding circuit and said independent circuit, and a circuit controlled by said relay for energizing said means for effecting relative movement.

17. In electric arc welding apparatus, a welding circuit including work material and a welding electrode, means for effecting relative movement between said work and electrode, an independent circuit, a relay having opposed magnetic fields respectively responsive to characteristics of said welding circuit and said independent circuit, and a plurality of circuits controlled by said relay for energizing said means for effecting relative movement.

18. In electric arc welding apparatus, a welding circuit including work material and a welding electrode, means for effecting relative movement between said work and electrode, an independent circuit, a relay having opposed magnetic fields respectively responsive to characteristics of said welding circuit and said independent circuit, and a pair of circuits respectively controlled by said relay upon the respective preponderance of said magnetic fields for energizing said means for effecting relative movement.

19. In arc welding mechanism, the combination of a welding electrode; a welding circuit; and electrically actuated means for moving said electrode axially in either direction, said means comprising a solenoid having an armature and a magnetic coil connected with said welding circuit so that its magnetic effect upon said armature is responsive to the voltage in said welding circuit, an independent circuit, a magnetic coil connected with said independent circuit and arranged to exert a magnetic effect on said armature opposed to the effect of said first named coil, an electric circuit for said electrode moving means, and switch means in said last named circuit responsive to movement of said armature.

20. In electric arc welding apparatus, a welding circuit including work material and a welding electrode, and means responsive to the voltage of the welding circuit for step by step relatively moving said electrode and the work.

21. In electric arc welding apparatus, a welding circuit including work material and a welding electrode, and means responsive to the voltage of the welding circuit for step by step relatively moving said electrode and the work axially of the electrode.

22. In electric arc welding apparatus, a welding circuit including work material and a welding electrode, and means responsive to the voltage of the welding circuit for step by step relatively moving said electrode and the work axially of the electrode in either direction.

23. In electric arc welding apparatus, a welding circuit including work material and a welding electrode, means for rotating said electrode as the welding operation proceeds, and means responsive to the voltage of the welding circuit for step by step relatively moving said electrode and the work axially of said electrode.

24. In electric arc welding apparatus, a welding circuit including work material and a welding electrode, means for rotating said electrode as the welding operation proceeds, and means responsive to the voltage of the welding circuit for step by step relatively moving said electrode and the work axially of said electrode in either direction.

25. In electric arc welding apparatus, a welding circuit including work material and a welding electrode, means for rotating said electrode as the welding operation proceeds, and means responsive to the rotation of said electrode and the voltage of the welding circuit for step by step relatively moving said electrode and the work.

26. In electric arc welding apparatus, a welding circuit including work material and a welding electrode, means for rotating said electrode as the welding operation proceeds, and means responsive to the rotation of said electrode and the voltage of the welding circuit for step by step relatively moving said electrode and the work axially of said electrode in either direction.

27. In electric arc welding apparatus, a welding circuit including work material and a welding electrode, a holder for said electrode having a rack extending axially thereof, a pinion in mesh with said rack for moving said holder axially, means for rotating said holder, and means functionally responsive to the voltage of the welding circuit for effecting rotation of said pinion.

28. In electric arc welding apparatus, a welding circuit including work material and a welding electrode, a holder for said electrode having a rack extending axially thereof, a pinion in mesh with said rack for moving said holder axially, means for rotating said holder, and means functionally responsive to the rotation of said holder for effecting rotation of said pinion.

29. In electric arc welding apparatus, a welding circuit including work material and a welding electrode, a holder for said electrode having a rack extending axially thereof, a pinion in mesh with said rack for moving said holder axially, means for rotating said holder, and means functionally responsive to the rotation of said holder for effecting rotation of said pinion in either direction.

30. In electric arc welding apparatus, a welding circuit including work material and a welding electrode, a holder for said electrode having a rack extending axially thereof, a pinion in mesh with said rack for moving said holder axially, means for rotating said holder, and means functionally responsive to the voltage of the welding circuit and the rotation of said holder for effecting rotation of said pinion.

31. In electric arc welding apparatus, a welding circuit including work material and a welding electrode, a holder for said electrode having a rack extending axially thereof, a pinion in mesh with said rack for moving said holder axially, means for rotating said holder, and means functionally responsive to the voltage of the welding circuit and the rotation of said holder for effecting step by step rotation of said pinion.

32. In electric arc welding apparatus, a welding circuit including work material and a welding electrode, a holder for said electrode having a rack extending axially thereof, a pinion in mesh with said rack for moving said holder axially, means for rotating said holder, and means functionally responsive to the voltage of the welding circuit and the rotation of said holder for effecting step by step rotation of said pinion in either direction.

33. In electric arc welding apparatus wherein a welding arc is maintained between a suitable electrode and the work, the combination of means for rotating said electrode, and means functionally responsive to the rotation of said electrode for feeding a strip of fluxing material into the arc.

34. In electric arc welding apparatus wherein a welding arc is maintained between a suitable electrode and the work, the combination of means for rotating said electrode, and means functionally responsive to the rotation of said electrode for feeding a strip of combustible material into the arc.

35. The method of electric arc welding which comprises establishing a welding arc between an electrode and the work, and relatively moving said electrode and the work in rapidly occurring short increments to maintain a constant arc length.

36. In electric arc welding, the method of adjusting the arc length to a desired value which comprises relatively moving the work and the electrode in rapidly re-occurring short increments of movement until the desired arc length is attained.

Signed by me this 19th day of July, 1928.

CECIL C. PECK.